(12) United States Patent
Matsunaga (10) Patent No.: US 11,279,352 B2
(45) Date of Patent: Mar. 22, 2022

(54) VEHICLE CONTROL DEVICE (71) Applicant: HONDA MOTOR CO., LTD., Tokyo (JP)

(72) Inventor: Hideki Matsunaga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 93 days.

(21) Appl. No.: 16/753,448

(22) PCT Filed: Oct. 6, 2017

(86) PCT No.: PCT/JP2017/036409
§ 371 (c)(1),
(2) Date: Apr. 3, 2020

(87) PCT Pub. No.: WO2019/069437
PCT Pub. Date: Apr. 11, 2019

(65) Prior Publication Data
US 2020/0255005 A1    Aug. 13, 2020

(51) Int. Cl.
*B60W 30/09* (2012.01)
*B60W 30/095* (2012.01)
(Continued)

(52) U.S. Cl.
CPC ......... *B60W 30/0956* (2013.01); *B60R 11/04* (2013.01); *B60W 30/16* (2013.01);
(Continued)

(58) Field of Classification Search
CPC ... B60R 11/04; B60W 30/0956; B60W 30/16; B60W 30/18159; B60W 50/0097;
(Continued)

(56) References Cited

U.S. PATENT DOCUMENTS

2012/0188098 A1* 7/2012 Mochizuki ....... G08G 1/096783
340/905
2016/0144861 A1   5/2016 Cao et al.
(Continued)

FOREIGN PATENT DOCUMENTS

| CN | 105528593 A | 4/2016 |
| JP | 2005-165643 A | 6/2005 |
| JP | 2007-094702 A | 4/2007 |

OTHER PUBLICATIONS

PCT/ISA/210 from International Application PCT/JP2017/036409 with the English translation thereof.
(Continued)

*Primary Examiner* — Anshul Sood
(74) *Attorney, Agent, or Firm* — Carrier Blackman & Associates, P.C.; Joseph P. Carrier; Jeffrey T. Gedeon (57) ABSTRACT

A vehicle control device comprises: a region recognition unit that recognizes a specific region present in a progression direction of a host vehicle, for example a crossing or an intersection, and identifies the type of the specific region; a space presence determination unit that determines whether or not there is a space through which the host vehicle can enter outside of exits of the specific region; and a vehicle control unit that controls the host vehicle according to the presence of the space. Furthermore, the space presence determination unit switches the method for determining the presence of the space in accordance with the type of the specific region.

2 Claims, 9 Drawing Sheets

(51) Int. Cl.
*B60W 30/16* (2020.01)
*G06V 20/58* (2022.01)
*B60R 11/04* (2006.01)
*G06K 9/00* (2022.01)

(52) U.S. Cl.
CPC ..... *G06K 9/00825* (2013.01); *B60W 2420/42* (2013.01); *B60W 2554/802* (2020.02)

(58) Field of Classification Search
CPC ..... B60W 2420/42; B60W 2554/4046; B60W 2554/80; B60W 2554/802; G06K 9/00791; G06K 9/00825; G08G 1/16
See application file for complete search history.

(56) References Cited

U.S. PATENT DOCUMENTS

2017/0270785 A1* 9/2017 Umehara ............. G08G 1/0112
2019/0073903 A1* 3/2019 Baba .................... G01S 13/867

OTHER PUBLICATIONS

Office Action with search report dated Aug. 17, 2021 issued over the corresponding Chinese Patent Application No. 201780095647.9 with the English translation of the pertinent portion.

* cited by examiner

VEHICLE CONTROL DEVICE

TECHNICAL FIELD

The present invention relates to a vehicle control device that controls a vehicle when the vehicle passes a particular area such as a railroad crossing or an intersection.

BACKGROUND ART

Some roads include an area where a passable state and an impassable state are switched, such as a railroad crossing or an intersection. Such an area is hereinafter referred to as a particular area. When a vehicle travels in the particular area, the vehicle needs to pass the particular area without stopping.

Japanese Laid-Open Patent Publication No. 2005-165643 discloses a driving assistance device. This driving assistance device determines whether a space that a vehicle can enter exists (or is generated) outside the particular area before the vehicle enters the particular area. If the space does not exist (or is not generated), the driving assistance device stops the vehicle or warns a vehicle occupant. Moreover, in Japanese Laid-Open Patent Publication No. 2005-165643, if the particular area is changed from a passable state to an impassable state when a host vehicle is stopped in the particular area, control for evacuating the host vehicle from the particular area is performed.

SUMMARY OF INVENTION

The optimum control for the host vehicle depends on travel situations. For example, the optimum control depends on whether the area is the particular area or a non-particular area, and also depends on the type of the particular area. Thus, when the host vehicle passes the particular area, it is desirable that flexible control suitable for the particular area is performed instead of fixed control.

The present invention has been made in view of the above problem, and an object is to provide a vehicle control device that can perform control suitable for a particular area when a host vehicle passes the particular area.

A vehicle control device according to the present invention includes one or more processors, wherein the one or more processors: recognize a particular area that exists in a travel direction of a host vehicle and identify a type of the particular area; determine whether a space that the host vehicle is allowed to enter exists outside an exit of the particular area; and control the host vehicle in accordance with presence or absence of the space, and wherein the one or more processors change a method for determining whether the space exists, in accordance with the type of the particular area.

According to the above structure, when the host vehicle travels toward the space outside the exit of the particular area, the method for determining whether the space that the host vehicle can enter exists is changed in accordance with the type of the particular area. Thus, it can be determined whether the space exists in accordance with the particular area. As a result, when the host vehicle passes the particular area, control in accordance with the particular area can be performed.

The vehicle control device according to the present invention may further recognize a preceding vehicle traveling ahead of the host vehicle; and predict behavior of the preceding vehicle, wherein: if the one or more processors identify the particular area as an intersection and if the one or more processors recognize the preceding vehicle outside the exit of the intersection, the one or more processors may determine whether the space exists behind the preceding vehicle after a present time, on a basis of a prediction result from the one or more processors; and if the one or more processors identify the particular area as a railroad crossing and if the one or more processors recognize the preceding vehicle outside the exit of the railroad crossing, the one or more processors may determine whether the space exists behind the preceding vehicle at the present time, on a basis of a recognition result from the one or more processors.

According to the above structure, in the intersection, it is determined whether the space exists behind the preceding vehicle after the present time. Thus, the host vehicle can pass the intersection quickly. If other vehicle behind the host vehicle tries to travel in a different direction that is different from that of the host vehicle, the other vehicle can travel in the different direction quickly because the host vehicle enters the intersection quickly. As described above, this structure contributes to easing a traffic jam. Moreover, according to the above structure, in the railroad crossing, it is determined whether the space exists behind the preceding vehicle at the present time. Thus, the host vehicle enters the railroad crossing when the space exists at the present time. At this time, a vehicle occupant can find that the host vehicle can pass the railroad crossing for sure. Thus, the vehicle occupant can drive without anxiety.

If a distance between the preceding vehicle and the exit of the railroad crossing is more than a length of the host vehicle, the one or more processors may determine that the space exists.

According to the above structure, the host vehicle can enter the space outside the exit of the railroad crossing after passing the railroad crossing.

According to the present invention, when the host vehicle passes the particular area, the control in accordance with the particular area can be performed.

DESCRIPTION OF EMBODIMENT

A preferred embodiment of a vehicle control device according to the present invention is hereinafter described in detail with reference to the attached drawings. Note that a vehicle corresponding to a subject of description is hereinafter referred to as a host vehicle, and a vehicle other than the host vehicle is referred to as other vehicle. Moreover, the other vehicle that travels ahead of the host vehicle in a travel direction is referred to as a preceding vehicle. Unless otherwise indicated, the preceding vehicle is the other vehicle that travels right in front of the host vehicle.

[1. Structure of Host Vehicle 10]

Figure 1:
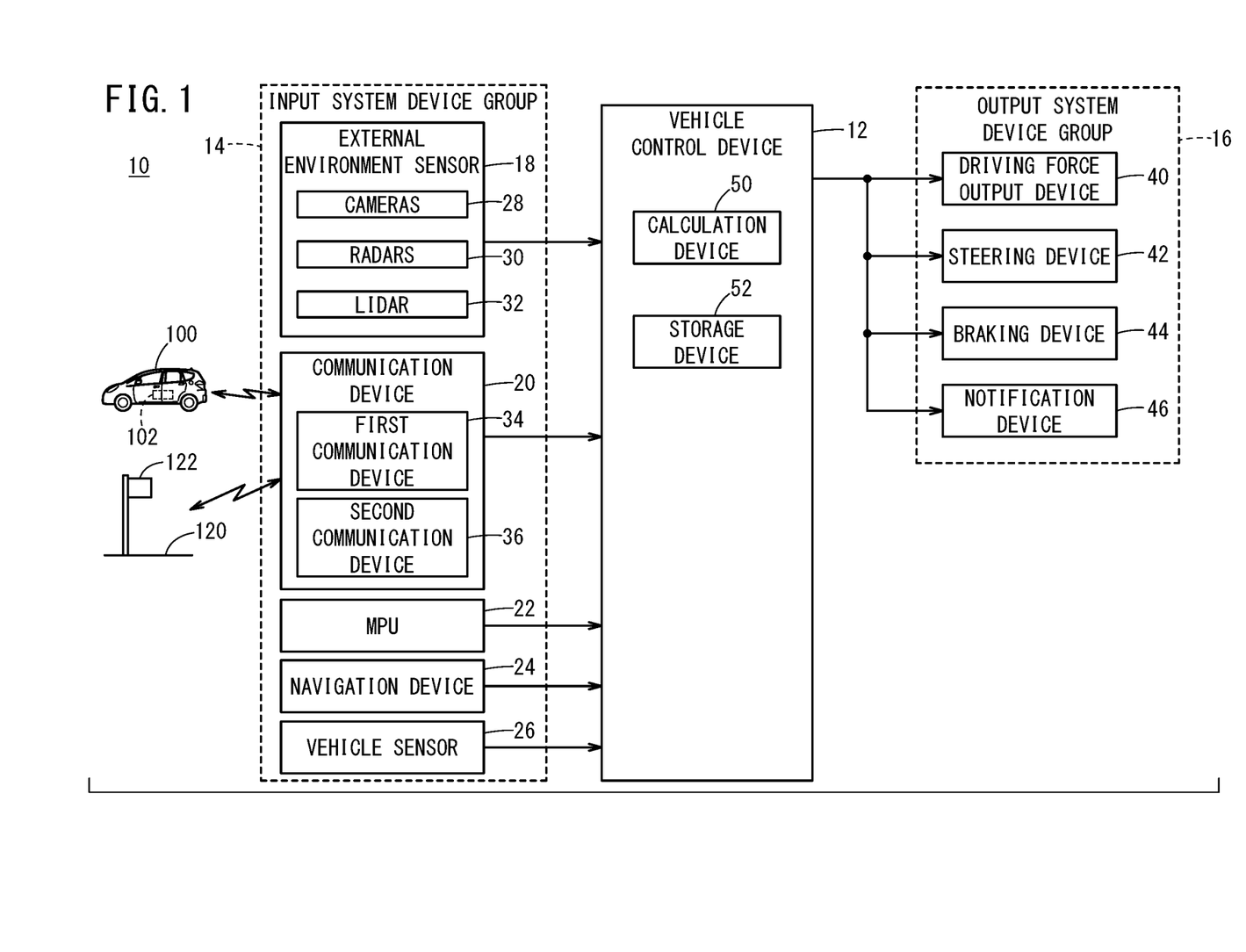
FIG. 1 is a block diagram of a host vehicle including a vehicle control device according to an embodiment.

As illustrated in FIG. 1, the host vehicle 10 includes a vehicle control device 12, an input system device group 14 that obtains or stores various pieces of information that are input by the vehicle control device 12, and an output system device group 16 that operates in accordance with various instructions that are output from the vehicle control device 12. The host vehicle 10 is an automated driving vehicle in which a driving operation is performed by the vehicle control device 12 (including fully automated driving vehicle), or a driving assistance vehicle in which a part of the driving operation is assisted.

[1.1. Input System Device Group 14]

The input system device group 14 includes: an external environment sensor 18 that detects a state of a periphery (external environment) of the host vehicle 10; a communication device 20 that exchanges information with various communication devices outside the host vehicle 10; an MPU (high-precision map) 22 whose accuracy of position is less than or equal to centimeters; a navigation device 24 that generates a travel route to a destination and measures the position of the host vehicle 10; and a vehicle sensor 26 that detects a travel state of the host vehicle 10.

The external environment sensor 18 includes one or more cameras 28 that capture images of the external environment, one or more radars 30 that detect the distance and the relative speed between the host vehicle 10 and an object around the host vehicle 10, and one or more LIDARs 32. The communication device 20 includes a first communication device 34 that performs inter-vehicle communication with a communication device 102 provided to another vehicle 100, and a second communication device 36 that performs road-vehicle communication with a communication device 122 provided to an infrastructure such as a travel path 120 or a railroad crossing 140. The navigation device 24 includes a satellite navigation system and a self-contained navigation system. The vehicle sensor 26 includes a vehicle speed sensor, an acceleration sensor, a yaw rate sensor, an inclination sensor, and the like that are not shown.

[1.2. Output System Device Group 16]

The output system device group 16 includes a driving force output device 40, a steering device 42, a braking device 44, and a notification device 46. The driving force output device 40 includes a driving force output ECU, and a driving source such as an engine or a traction motor. The driving force output device 40 generates driving force in response to an occupant's operation on an accelerator pedal or a driving control instruction that is output from the vehicle control device 12. The steering device 42 includes an electric power steering system (EPS) ECU, and an EPS actuator. The steering device 42 generates steering force in response to an occupant's operation on a steering wheel or a steering control instruction that is output from the vehicle control device 12. The braking device 44 includes a brake ECU and a brake actuator. The braking device 44 generates braking force in response to an occupant's operation on a brake pedal or a braking control instruction that is output from the vehicle control device 12. The notification device 46 includes a notification ECU and an information transmission device (such as a display device, an acoustic device, or a tactile device). The notification device 46 notifies a vehicle occupant in response to a notification instruction that is output from the vehicle control device 12 or another ECU.

[1.3. Vehicle Control Device 12]

Figure 2:
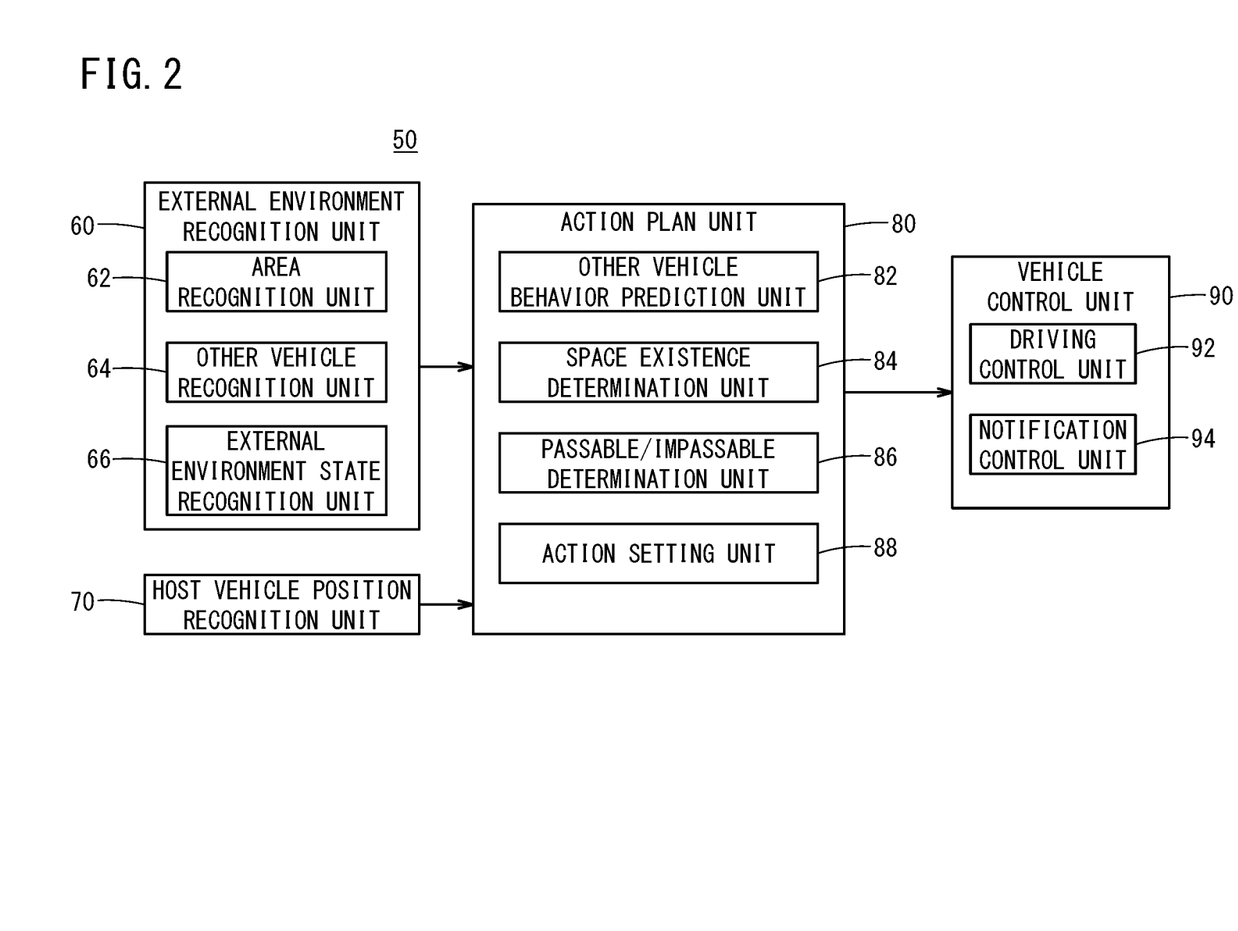
FIG. 2 is a function block diagram of the vehicle control device.

The vehicle control device 12 includes an ECU, and includes a calculation device 50 such as a processor and a storage device 52 such as a ROM or a RAM. The vehicle control device 12 achieves various functions when the calculation device 50 executes programs stored in the storage device 52. As illustrated in FIG. 2, the calculation device 50 functions as an external environment recognition unit 60, a host vehicle position recognition unit 70, an action plan unit 80, and a vehicle control unit 90.

The external environment recognition unit 60 recognizes a circumstance and an object around the host vehicle 10 on the basis of information output from the external environment sensor 18. The external environment recognition unit 60 includes an area recognition unit 62, an other vehicle recognition unit 64, and an external environment state recognition unit 66. The area recognition unit 62 recognizes the existence, the type, the size, the border position, and the like of a particular area {railroad crossing 140 (for example, FIG. 5), intersection 160 (for example, FIG. 8), movable bridge, for example} that is positioned in a travel direction 106 (for example, FIG. 5) of the host vehicle 10 on the basis of image information from the camera 28. The other vehicle recognition unit 64 recognizes the existence, the position, the size, and the type of the other vehicle 100 that travels or stops around the host vehicle 10, and moreover the distance and the relative speed between the host vehicle 10 and the other vehicle 100 on the basis of the image information from the camera 28 and/or detection information from the radar 30 and the LIDAR 32. The external environment state recognition unit 66 recognizes overall road environment such as a road shape, a road width, a position of a lane mark, the number of lanes, a lane width, a lighting state of a traffic signal 162 (for example, FIG. 8), and an open/close state of a crossing gate 142 (for example, FIG. 5) on the basis of the image information from the camera 28.

The host vehicle position recognition unit 70 recognizes the position of the host vehicle 10 and map information around the host vehicle 10 on the basis of information output from the navigation device 24 and the MPU 22.

The action plan unit 80 determines a travel status of the host vehicle 10 on the basis of recognition results from the external environment recognition unit 60 and the host vehicle position recognition unit 70 and a detection result from the vehicle sensor 26, and sets various actions of the host vehicle 10. The action plan unit 80 includes an other vehicle behavior prediction unit 82, a space existence determination unit 84, a passable/impassable determination unit 86, and an action setting unit 88. The other vehicle behavior prediction unit 82 predicts behavior of the other vehicle 100 on the basis of a recognition result from the other vehicle recognition unit 64. The space existence determination unit 84 determines whether a space 130 (for example, FIG. 5, FIG. 8) that the host vehicle 10 can enter exists outside an exit 140o, 160o of the particular area (for example, FIG. 5, FIG. 8) on the basis of the recognition result from the external environment recognition unit 60 and a prediction result from the other vehicle behavior prediction unit 82. The space existence determination unit 84 changes a method for determining whether the space 130 exists, in accordance with the type of the particular area. The passable/impassable determination unit 86 determines whether the particular area is in a passable state or an impassable state on the basis of the recognition result from the external environment recognition unit 60. The action setting unit 88 sets the action to be taken by the host vehicle 10 on the basis of the recognition results from the external environment recognition unit 60 and the host vehicle position recognition unit 70, and determination results from the other vehicle behavior prediction unit 82, the space existence determination unit 84, and the passable/impassable determination unit 86. In a case of making the host vehicle 10 travel, a travel trajectory (target travel trajectory) and vehicle speed (target vehicle speed) targeted by the host vehicle 10 are set.

The vehicle control unit 90 calculates a control instruction value for the output system device group 16 on the basis of a determination result from the action plan unit 80. The vehicle control unit 90 includes a driving control unit 92 that performs travel control and a notification control unit 94 that performs notification control. The driving control unit 92 generates a control instruction in accordance with the target travel trajectory and the target vehicle speed that are set by the action plan unit 80, and outputs the control instruction to the driving force output device 40, the steering device 42, and the braking device 44. The notification control unit 94 generates a notification instruction for the vehicle occupant and outputs the notification instruction to the notification device 46.

[2. Operation of Vehicle Control Device 12]

[2.1. Main Process]

Figure 3:
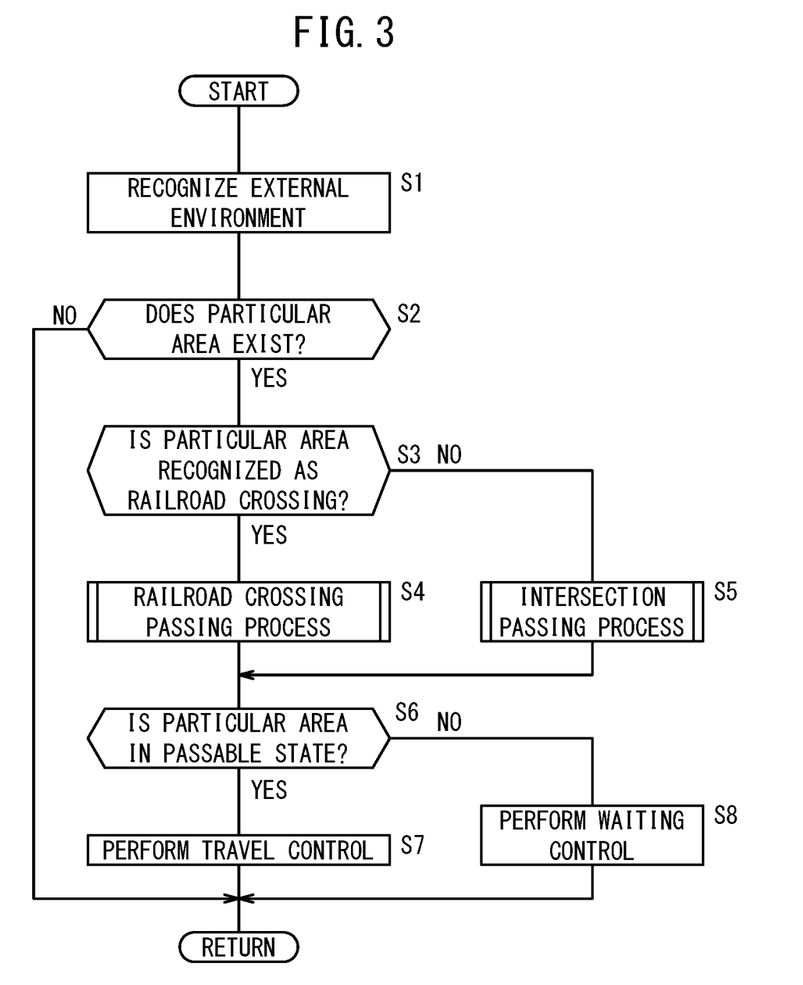
FIG. 3 is a flowchart of a main process that is performed in the vehicle control device.

A main process to be performed by the vehicle control device 12 is described with reference to FIG. 3. In the present invention, the method for determining whether the space 130 that the host vehicle 10 can enter exists outside the exit 140*o*, 160*o* of the particular area is changed in accordance with the type of the particular area. In this example, the process of the vehicle control device 12 is described. In this process, the vehicle control device 12 changes a method for determining the presence or absence of the space 130, depending on whether the particular area is the railroad crossing 140 or the intersection 160 (other than the railroad crossing 140). The process to be described below is repeatedly performed while a power source of the host vehicle 10 is on.

In step S1, the external environment recognition unit 60 recognizes the external environment by inputting the latest information that is output from the input system device group 14.

Figure 5:
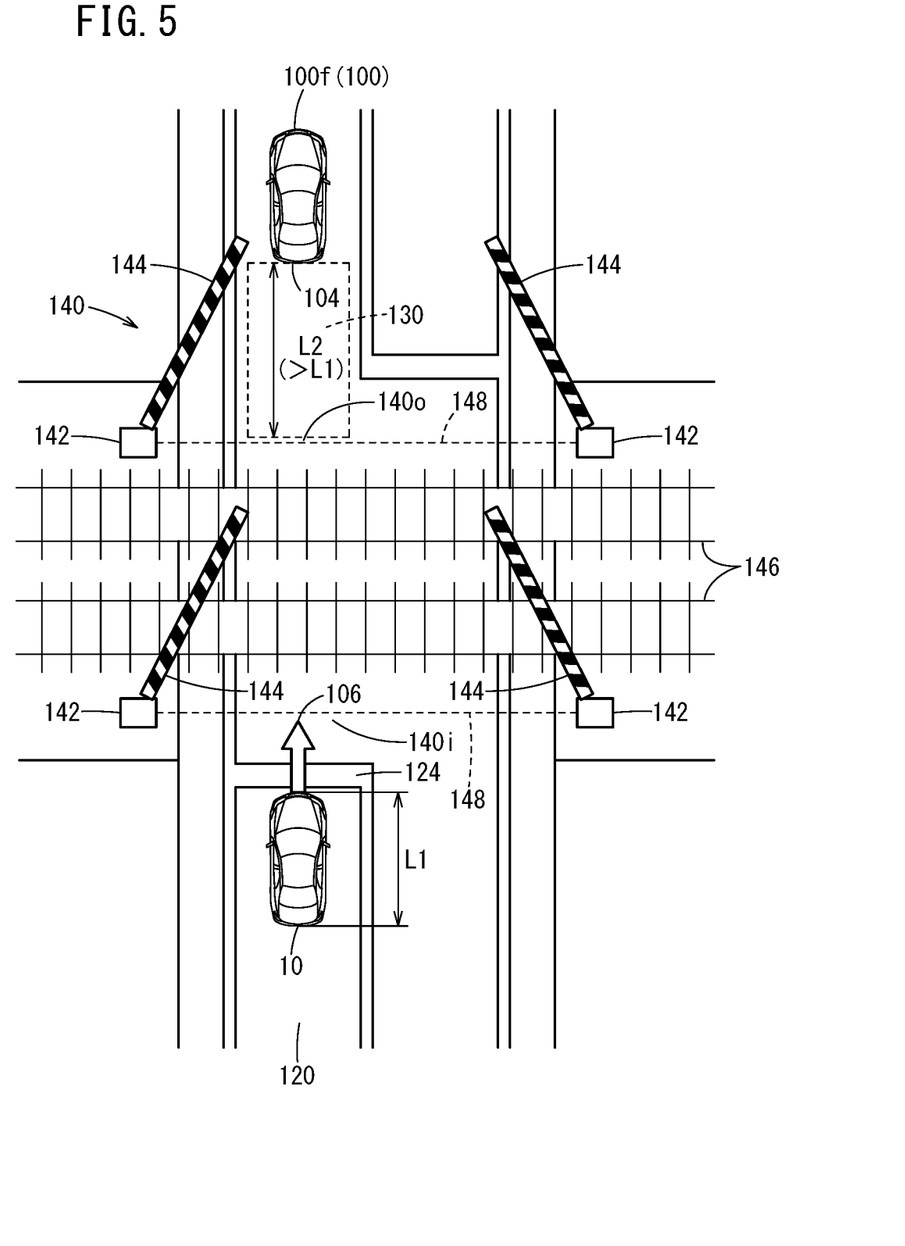
FIG. 5 is an explanatory diagram expressing a case where a space exists outside a railroad crossing.
Figure 8:
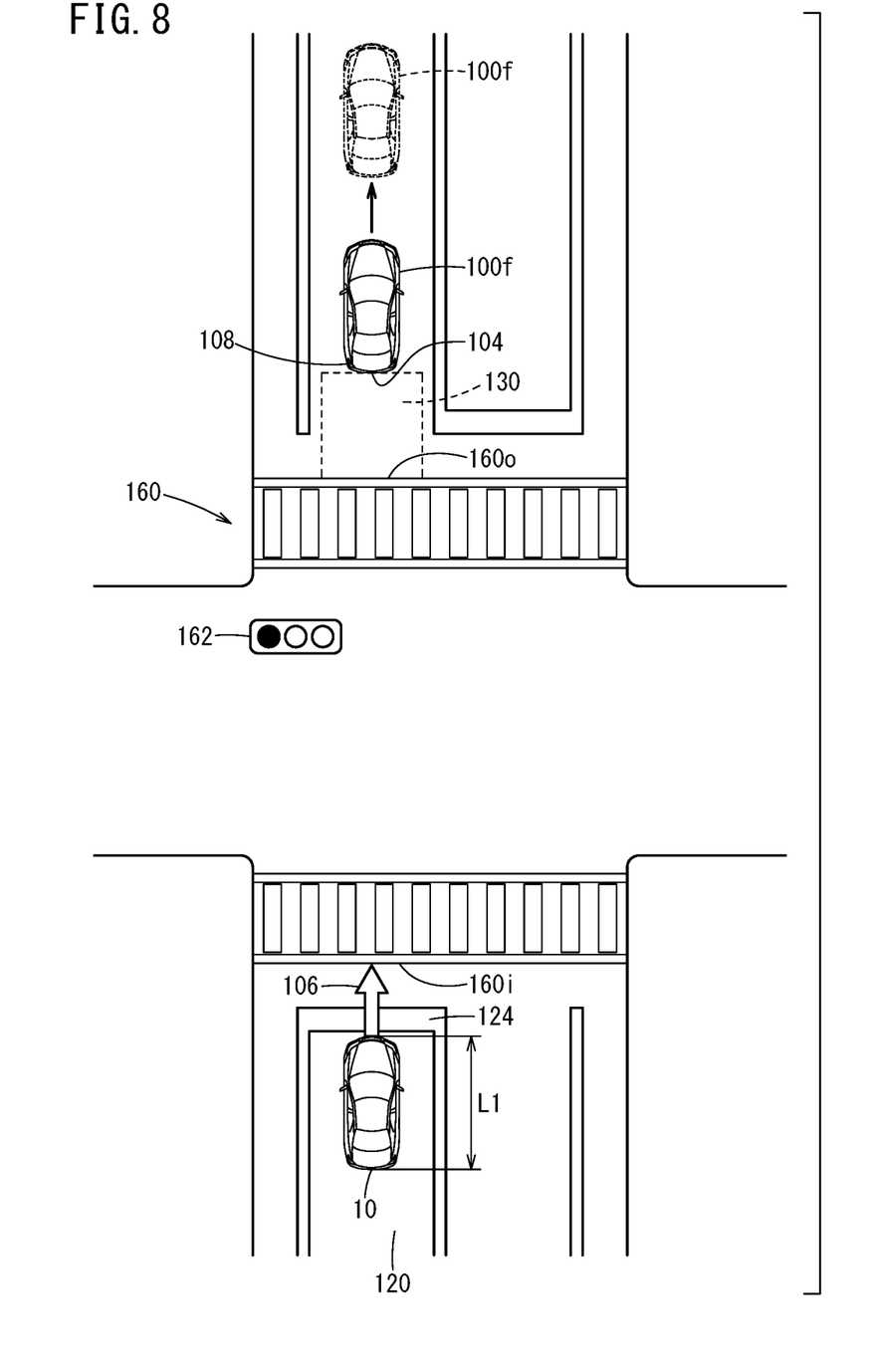
FIG. 8 is an explanatory diagram expressing a case where it is predicted that the space exists outside an intersection.

In step S2, the area recognition unit 62 recognizes the area ahead of the host vehicle 10. If the area recognition unit 62 recognizes a facility or a structure unique to the particular area typified by the railroad crossing 140 and the intersection 160 here, the area recognition unit 62 recognizes the existence of the particular area. For example, by recognizing the crossing gate 142 or a railroad line 146 (both are illustrated in FIG. 5, for example), the area recognition unit 62 recognizes the existence of the railroad crossing 140, and by recognizing the traffic signal 162 or the travel path 120 ahead of the host vehicle 10 (both are illustrated in FIG. 8, for example), the area recognition unit 62 recognizes the intersection 160. Moreover, if a preceding vehicle 100*f* is not recognized between the host vehicle 10 and the particular area, it is recognized that the particular area exists right in front of the host vehicle 10. If the particular area exists (step S2: YES), the process advances to step S3. On the other hand, if the particular area does not exist (step S2: NO), the process ends once and stands by for the next cycle.

When the process has advanced from step S2 to step S3, it is determined whether the type of the particular area is the railroad crossing 140. If the area recognition unit 62 recognizes the railroad crossing 140 (step S3: YES), the process advances to step S4. On the other hand, if the area recognition unit 62 recognizes the intersection 160, that is, if the area recognition unit 62 does not recognize the railroad crossing 140 (step S3: NO), the process advances to step S5.

When the process has advanced from step S3 to step S4, a railroad crossing passing process is performed. The railroad crossing passing process is a process in which the host vehicle 10 waits before the railroad crossing 140 until the space 130 that the host vehicle 10 can enter is formed outside the exit 140*o* of the railroad crossing 140. The railroad crossing passing process is described in [2.2] below.

When the process has advanced from step S3 to step S5, an intersection passing process is performed. The intersection passing process is a process in which the host vehicle 10 waits before the intersection 160 until the space 130 that the host vehicle 10 can enter is formed or is predicted to be formed outside the exit 160*o* of the intersection 160. The intersection passing process is described in [2.3] below.

After the process in step S4 or the process in step S5, the passable/impassable determination unit 86 determines whether the particular area is in the passable state or the impassable state in step S6. For example, the determination is performed as follows.

If the particular area is the railroad crossing 140, the external environment state recognition unit 66 recognizes a gate 144 (crossing bar, rope, or the like, FIG. 5, for example) of the crossing gate 142 or a warning light on the basis of the image information from the camera 28. If the gate 144 recognized by the external environment state recognition unit 66 is stopped and is at a position that is higher than a predetermined position, the passable/impassable determination unit 86 determines that the particular area is in the passable state. On the other hand, if the gate 144 is currently operated or is at a position that is lower than the predetermined position, the passable/impassable determination unit 86 determines that the particular area is in the impassable state. Alternatively, if the warning light recognized by the external environment state recognition unit 66 is off, the passable/impassable determination unit 86 may determine that the particular area is in the passable state. On the other hand, if the warning light is on, the passable/impassable determination unit 86 may determine that the particular area is in the impassable area.

If the particular area is the intersection 160, the external environment state recognition unit 66 recognizes the traffic signal 162 on the basis of the image information from the camera 28. If the traffic signal 162 indicates travel permission, the passable/impassable determination unit 86 determines that the particular area is in the passable state. On the other hand, if the traffic signal 162 indicates a message other than the travel permission (stop instruction, for example), the passable/impassable determination unit 86 determines that the particular area is in the impassable state.

Note that if the information that is received from the outside through the second communication device 36 includes information as to whether the particular area is passable or impassable, the passable/impassable determination unit 86 may determine whether the particular area is in the passable state or the impassable state on the basis of this information.

If the particular area is in the passable state (step S6: YES), the process advances to step S7. On the other hand, if the particular area is in the impassable state (step S6: NO), the process advances to step S8.

When the process has advanced from step S6 to step S7, the action setting unit 88 selects to perform the travel control of the host vehicle 10. For example, in automated driving, the action setting unit 88 sets the target travel trajectory and the target vehicle speed to cause the host vehicle 10 to travel toward the exit 140o, 160o of the particular area. The driving control unit 92 outputs the control instruction in accordance with the target travel trajectory and the target vehicle speed to the driving force output device 40, the steering device 42, and the braking device 44. In manual driving, the action setting unit 88 selects to notify that the host vehicle 10 can travel. The action setting unit 88 outputs the notification instruction to the notification device 46.

When the process has advanced from step S6 to step S8, the action setting unit 88 selects to perform waiting control of the host vehicle 10. For example, in the automated driving, the action setting unit 88 sets the target travel trajectory and the target vehicle speed to cause the host vehicle 10 to stop at an entrance 140i, 160i of the particular area (for example, FIG. 5). If the host vehicle 10 has already stopped, the host vehicle 10 continues to stop. The driving control unit 92 outputs the control instruction in accordance with the target travel trajectory and the target vehicle speed to the driving force output device 40, the steering device 42, and the braking device 44. In the manual driving, the action setting unit 88 selects to notify that the host vehicle 10 cannot travel. The action setting unit 88 outputs the notification instruction to the notification device 46.

[2.2. Railroad Crossing Passing Process]

Figure 4:
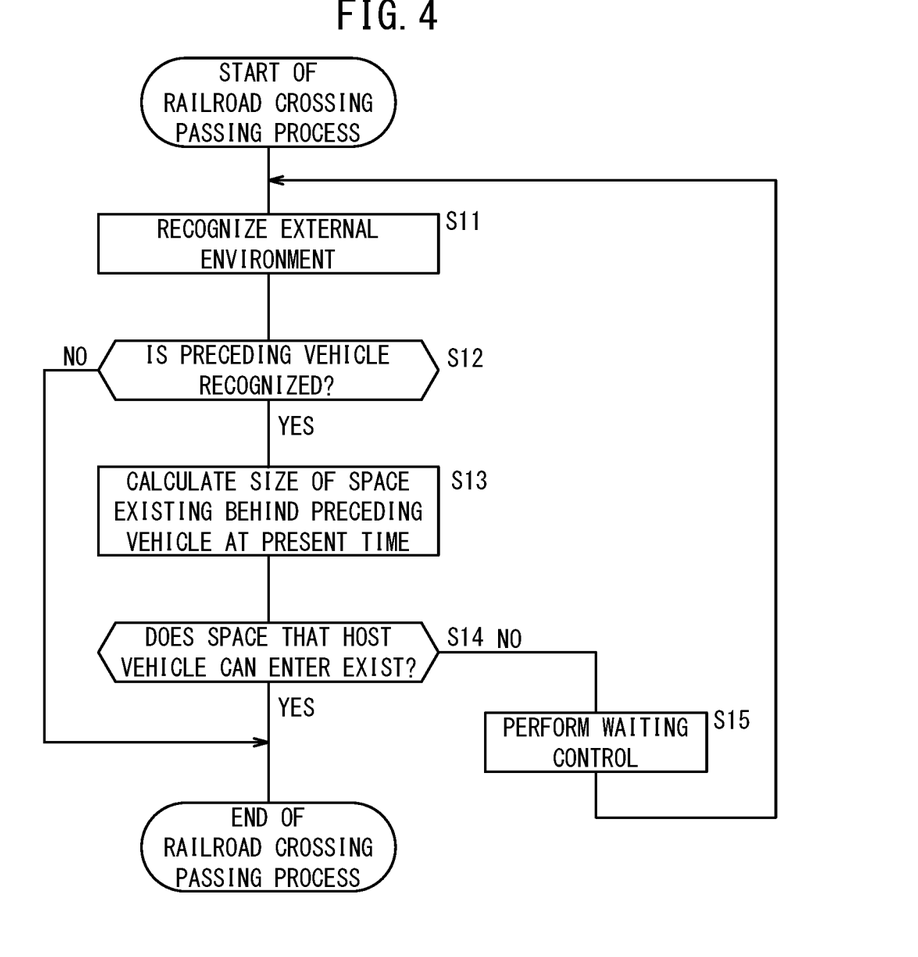
FIG. 4 is a flowchart of a railroad crossing passing process that is performed in the vehicle control device.
Figure 6:
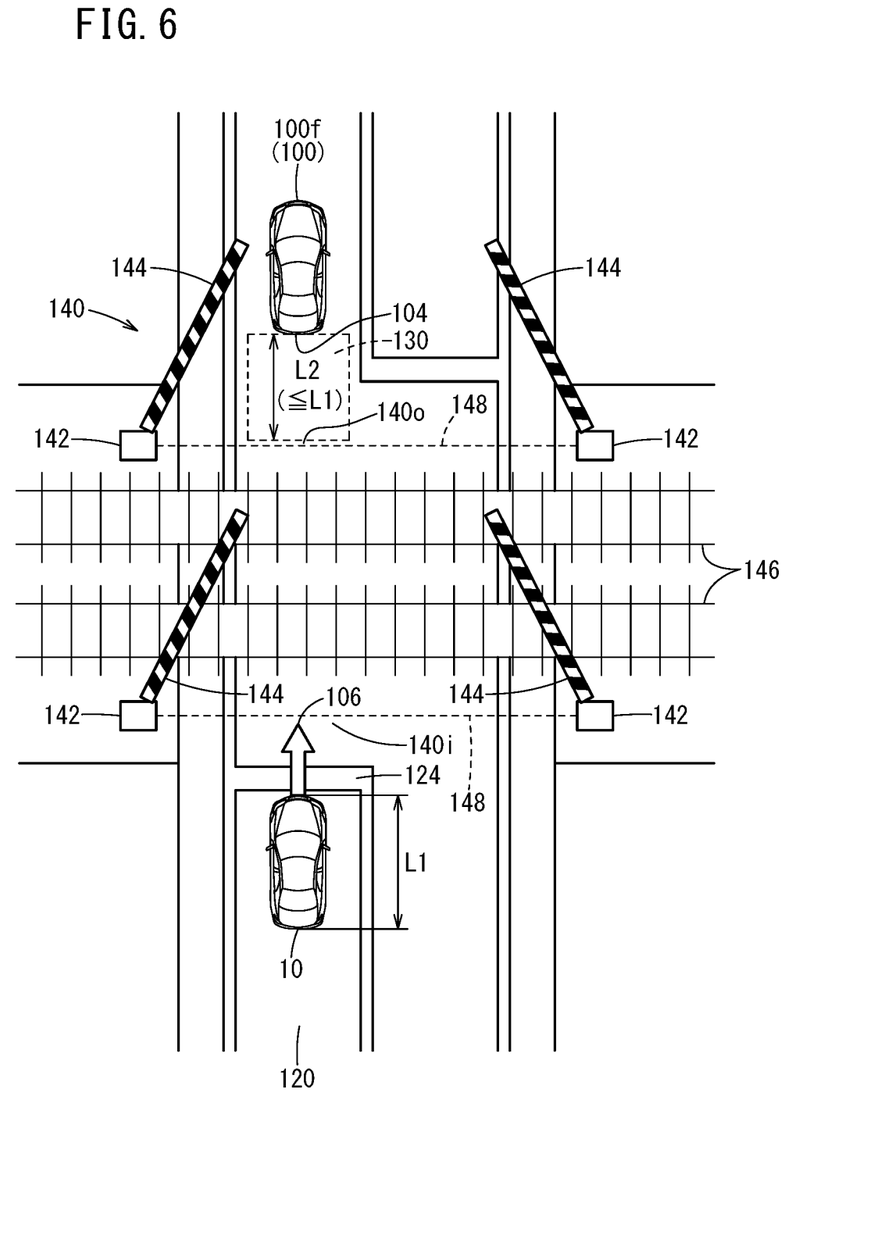
FIG. 6 is an explanatory diagram expressing a case where the space does not exist outside the railroad crossing.

The railroad crossing passing process to be performed in the vehicle control device 12 is described with reference to FIG. 4 to FIG. 6. The railroad crossing passing process is a process that is performed in step S4 in the main process illustrated in FIG. 3. Here, the determination process of determining whether the space 130 that the host vehicle 10 can enter exists (FIG. 5) or does not exist (FIG. 6) outside the exit 140o of the railroad crossing 140 is performed, and if the space 130 does not exist, the process in which the host vehicle 10 waits before the railroad crossing 140 is performed.

In step S11, the external environment recognition unit 60 recognizes the external environment by inputting the latest information that is output from the input system device group 14.

In step S12, it is determined whether the other vehicle recognition unit 64 recognizes the preceding vehicle 100f outside the exit 140o of the railroad crossing 140. If the preceding vehicle 100f is recognized (step S12: YES), the process advances to step S13. On the other hand, if the preceding vehicle 100f is not recognized (step S12: NO), the enough space 130 exists outside the exit 140o of the railroad crossing 140. Thus, the railroad crossing passing process ends and the process advances to step S6 in the main process illustrated in FIG. 3.

When the process has advanced from step S12 to step S13, the space existence determination unit 84 calculates the size of the space 130 existing behind the preceding vehicle 100f at the present time. For example, as illustrated in FIG. 5 and FIG. 6, the distance between the position of a rear part 104 (rear wheels, number plate, bumper, or the like) of the preceding vehicle 100f recognized by the other vehicle recognition unit 64 and the position of the exit 140o of the railroad crossing 140 recognized by the area recognition unit 62 is calculated as the size of the space 130 (space length L2). Here, the area recognition unit 62 recognizes the position of a border line 148, and the positions of the entrance 140i and the exit 140o of the railroad crossing 140 as follows. It is assumed that the border line 148 is a virtual line that passes the position of the crossing gate 142 and is parallel to the railroad line 146. Alternatively, the border line 148 may be a virtual line that is a predetermined distance away from the railroad line 146 along the travel path 120, and is parallel to the railroad line 146. In addition, it is assumed that the position of the entrance 140i is the position of the border line 148 that the host vehicle 10 travels over when the host vehicle 10 enters the railroad crossing 140 from the outside along the travel direction 106. Moreover, it is assumed that the position of the exit 140o is the position of the border line 148 that the host vehicle 10 travels over when the host vehicle 10 exits from the railroad crossing 140 to the outside along the travel direction 106.

In step S14, the space existence determination unit 84 determines whether the space 130 that the host vehicle 10 can enter exists on the basis of the recognition result. The space existence determination unit 84 compares the space length L2 and a vehicle length L1 of the host vehicle 10. The vehicle length L1 is stored in the storage device 52 in advance. As illustrated in FIG. 5, if the vehicle length L1 is less than the space length L2, that is, if the space 130 that the host vehicle 10 can enter exists (step S14: YES), the railroad crossing passing process ends and the process advances to step S6 in the main process. On the other hand, as illustrated in FIG. 6, if the vehicle length L1 is more than or equal to the space length L2, that is, if the space 130 that the host vehicle 10 can enter does not exist (step S14: NO), the process advances to step S15. Note that a predetermined distance a may be added to the space length L2 as an allowance, and the vehicle length L1 and the space length L2+α may be compared.

When the process has advanced from step S14 to step S15, the action setting unit 88 selects to perform the waiting control of the host vehicle 10. For example, in the automated driving, the action setting unit 88 sets the target travel trajectory and the target vehicle speed to cause the host vehicle 10 to stop at the entrance 140i of the particular area or a stop line 124. If the host vehicle 10 has already stopped, the host vehicle 10 continues to stop. The driving control unit 92 outputs the control instruction in accordance with the target travel trajectory and the target vehicle speed to the driving force output device 40, the steering device 42, and the braking device 44. In the manual driving, the action setting unit 88 selects to notify that the host vehicle 10 cannot travel. The notification control unit 94 outputs the notification instruction to the notification device 46.

[2.3. Intersection Passing Process]

Figure 7:
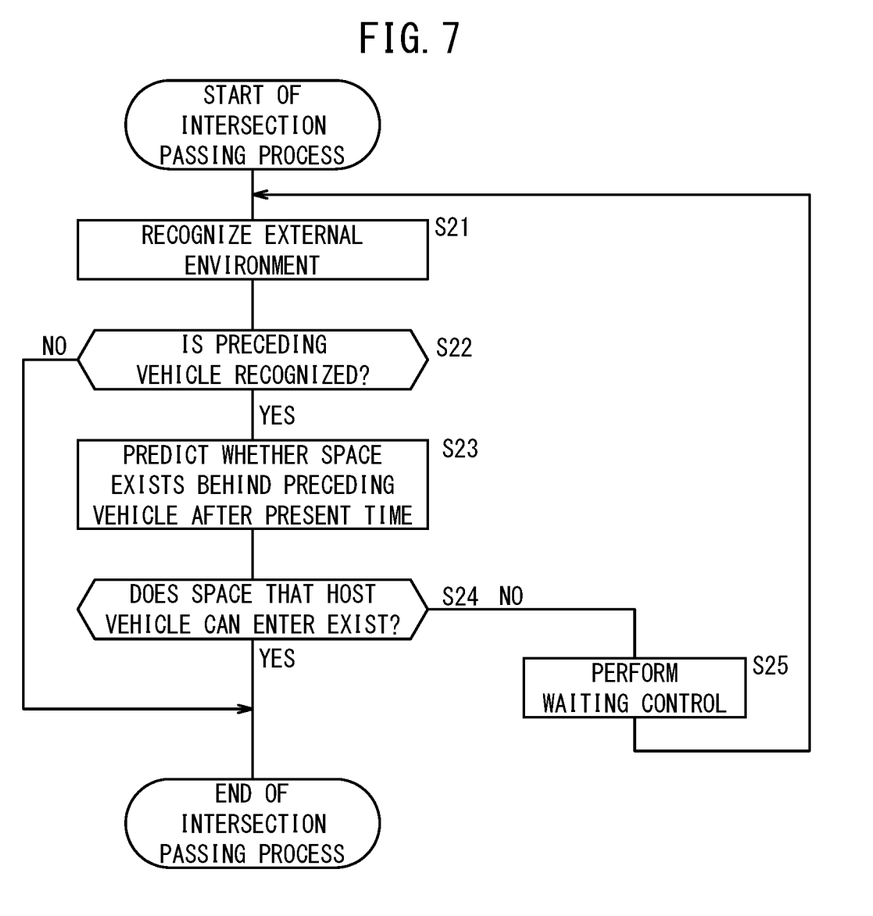
FIG. 7 is a flowchart of an intersection passing process that is performed in the vehicle control device.
Figure 9:
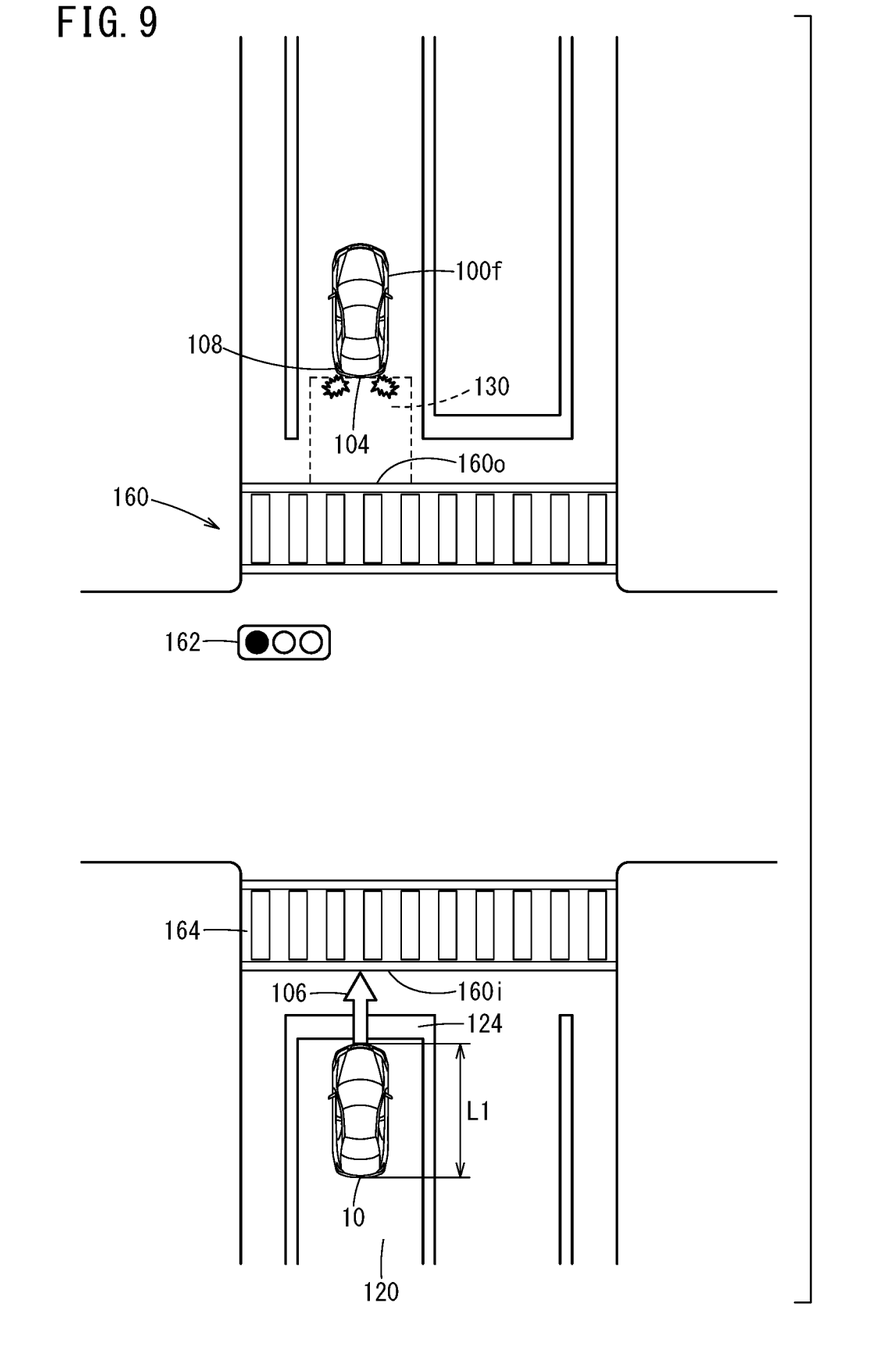
FIG. 9 is an explanatory diagram expressing a case where it is predicted that the space does not exist outside the intersection.

The intersection passing process is described with reference to FIG. 7 to FIG. 9. The intersection passing process is a process that is performed in step S5 in the main process illustrated in FIG. 3. Here, the determination process of determining whether the space 130 that the host vehicle 10 can enter exists (FIG. 8) or does not exist (FIG. 9) outside the exit 160o of the intersection 160 is performed, and if the space 130 does not exist, the process in which the host vehicle 10 waits before the intersection 160 is performed.

In step S21, the external environment recognition unit 60 recognizes the external environment by inputting the latest information that is output from the input system device group 14.

In step S22, it is determined whether the other vehicle recognition unit 64 recognizes the preceding vehicle 100f outside the exit 160o of the intersection 160. If the preceding vehicle 100f is recognized (step S22: YES), the process advances to step S23. On the other hand, if the preceding vehicle 100f is not recognized (step S22: NO), the enough space 130 exists outside the exit 160o of the intersection 160. Thus, the intersection passing process ends and the process advances to step S6 in the main process illustrated in FIG. 3.

When the process has advanced from step S22 to step S23, the other vehicle behavior prediction unit 82 predicts whether the space 130 exists behind the preceding vehicle 100*f* after the present time. For example, the other vehicle behavior prediction unit 82 determines a lighting state of a brake lamp 108 of the preceding vehicle 100*f* on the basis of the recognition result from the other vehicle recognition unit 64. If the brake lamp 108 of the preceding vehicle 100*f* is on, there is a high possibility that the preceding vehicle 100*f* is stopped at the present time. Thus, there is a low possibility that the space 130 that the host vehicle 10 can enter will be formed outside the exit 160*o* of the intersection 160 within a predetermined time. Therefore, the other vehicle behavior prediction unit 82 predicts that the preceding vehicle 100*f* stays at the current position after the present time and then, predicts that the space 130 that the host vehicle 10 can enter does not exist outside the exit 160*o* of the intersection 160. On the other hand, if the brake lamp 108 of the preceding vehicle 100*f* is off, there is a high possibility that the preceding vehicle 100*f* is currently traveling forward. Thus, there is a high possibility that the space 130 that the host vehicle 10 can enter will be formed outside the exit 160*o* of the intersection 160 within the predetermined time. Therefore, the other vehicle behavior prediction unit 82 predicts that the preceding vehicle 100*f* will go away from the intersection 160 sufficiently after the present time and then, predicts that the space 130 that the host vehicle 10 can enter exists outside the exit 160*o* of the intersection 160.

Note that the presence or absence of the space 130 may be predicted by detecting the vehicle speed of the preceding vehicle 100*f* instead of the lighting state of the brake lamp 108 of the preceding vehicle 100*f*. At this time, if the vehicle speed of the preceding vehicle 100*f* is zero, it is predicted that the space 130 does not exist, and if the vehicle speed of the preceding vehicle 100*f* is more than zero, it is predicted that the space 130 exists. Alternatively, the behavior of a few preceding vehicles 100*f* that travel ahead of the preceding vehicle 100*f* right in front of the host vehicle 10 may be predicted. If it is predicted that these preceding vehicles 100*f* travel forward, it may be predicted that the preceding vehicle 100*f* that is right in front of the host vehicle 10 travels forward.

In step S24, the space existence determination unit 84 determines whether the space 130 that the host vehicle 10 can enter exists on the basis of the prediction result. If the space 130 that the host vehicle 10 can enter exists (step S24: YES), the intersection passing process ends and the process advances to step S6 in the main process illustrated in FIG. 3. On the other hand, if the space 130 that the host vehicle 10 can enter does not exist (step S24: NO), the process advances to step S25.

When the process has advanced from step S24 to step S25, the action setting unit 88 selects to perform the waiting control of the host vehicle 10. Here, the same process as that in step S15 in FIG. 4 is performed.

[3. Modification]

The aforementioned embodiment is one example of the present invention. The present invention can be applied to various embodiments. For example, instead of the external environment recognition unit 60, the host vehicle position recognition unit 70 may perform the function of the area recognition unit 62. In this case, the area recognition unit 62 recognizes the particular area on the basis of the information from the MPU 22 and the navigation device 24. Specifically, the map information ahead of the host vehicle 10 is acquired from the MPU 22, and the existence, the type, the size, the border position, and the like of the particular area are recognized. Note that the information about the particular area can be acquired from the second communication device 36.

Moreover, the other vehicle recognition unit 64 may be used instead of the external environment sensor 18 to acquire various pieces of information about the preceding vehicle 100*f*, for example, the information about the vehicle speed, the position, the travel direction, and the like through the inter-vehicle communication performed by the first communication device 34.

Furthermore, the external environment state recognition unit 66 may be used instead of the external environment sensor 18 to acquire the information about the lighting state of the traffic signal 162, the open/close state of the crossing gate 142, and the like from the second communication device 36.

Furthermore, in the description of the process of the vehicle control device 12 according to the above embodiment, only the railroad crossing 140 and the intersection 160 are recognized as the particular area. However, another particular area, for example, the movable bridge may be recognized and the method for determining whether the space 130 exists may be changed, for example.

[4. Summary of the Present Embodiment]

The vehicle control device 12 includes: the area recognition unit 62 configured to recognize the particular area, for example, the railroad crossing 140 or the intersection 160 that exists in the travel direction 106 of the host vehicle 10 and identify the type of the particular area; the space existence determination unit 84 configured to determine whether the space 130 that the host vehicle 10 can enter exists outside the exit 140*o*, 160*o* of the particular area; and the vehicle control unit 90 configured to control the host vehicle 10 in accordance with the presence or absence of the space 130. Moreover, the space existence determination unit 84 changes a method for determining whether the space 130 exists, in accordance with the type of the particular area.

According to the above structure, when the host vehicle 10 travels toward the space 130 outside the exit 140*o*, 160*o* of the particular area, the method for determining whether the space 130 that the host vehicle 10 can enter exists is changed in accordance with the type of the particular area. Thus, it can be determined whether the space 130 exists in accordance with the particular area. As a result, when the host vehicle 10 passes the particular area, the control in accordance with the particular area can be performed.

The vehicle control device 12 further includes: the other vehicle recognition unit 64 configured to recognize the preceding vehicle 100*f* traveling ahead of the host vehicle 10; and the other vehicle behavior prediction unit 82 configured to predict the behavior of the preceding vehicle 100*f*. If the area recognition unit 62 identifies the particular area as the intersection 160 and if the other vehicle recognition unit 64 recognizes the preceding vehicle 100*f* outside the exit 160*o* of the intersection 160 (step S22 in FIG. 7: YES), the space existence determination unit 84 determines whether the space 130 exists behind the preceding vehicle 100*f* after the present time, on the basis of the prediction result from the other vehicle behavior prediction unit 82 (step S24 in FIG. 7). Moreover, if the area recognition unit 62 identifies the particular area as the railroad crossing 140 and if the other vehicle recognition unit 64 recognizes the preceding vehicle 100*f* outside the exit 140*o* of the railroad crossing 140 (step S12 in FIG. 4: YES), the space existence determination unit 84 determines whether the space 130 exists behind the preceding vehicle 100*f* at the present time, on the basis of the recognition result from the other vehicle recognition unit 64 (step S14 in FIG. 4).

According to the above structure, in the intersection 160, it is determined whether the space 130 exists behind the preceding vehicle 100f after the present time. Thus, the host vehicle 10 can pass the intersection 160 quickly. If the other vehicle 100 behind the host vehicle 10 tries to travel in a different direction that is different from that of the host vehicle 10, the other vehicle 100 can travel in the different direction quickly because the host vehicle 10 enters the intersection 160 quickly. As described above, this structure contributes to easing a traffic jam. Moreover, according to the above structure, in the railroad crossing 140, it is determined whether the space 130 exists behind the preceding vehicle 100f at the present time. Thus, the host vehicle 10 enters the railroad crossing 140 when the space 130 exists at the present time. At this time, the vehicle occupant can find that the host vehicle 10 can pass the railroad crossing 140 for sure. Thus, the vehicle occupant can drive without anxiety.

If the distance between the preceding vehicle 100f and the exit 140o of the railroad crossing 140 (space length L2) is more than the length of the host vehicle 10 (vehicle length L1), the space existence determination unit 84 determines that the space 130 exists.

According to the above structure, the host vehicle 10 can enter the space 130 outside the exit 140o of the railroad crossing 140 after passing the railroad crossing 140.

The vehicle control device according to the present invention is not limited to the above embodiment, and can employ various structures without departing from the concept of the present invention.

The invention claimed is:

1. A vehicle control device comprising one or more processors, wherein
the one or more processors:
on a basis of image information from a camera, recognize a particular area that exists in a travel direction of a host vehicle and identify a type of the particular area;
determine whether a space that the host vehicle is allowed to enter exists outside an exit of the particular area;
control the host vehicle in accordance with presence or absence of the space;
on the basis of the image information from the camera, recognize a preceding vehicle traveling ahead of the host vehicle; and
predict whether the space is formed on a basis of a recognition result from the one or more processors, and wherein:
the one or more processors change a method for determining whether the space exists, in accordance with the type of the particular area;
if the one or more processors identify the particular area as an intersection and if the one or more processors recognize the preceding vehicle outside the exit of the intersection, the one or more processors determine whether the space exists behind the preceding vehicle after a present time, on a basis of a prediction result from the one or more processors;
if the one or more processors identify the particular area as a railroad crossing and if the one or more processors recognize the preceding vehicle outside the exit of the railroad crossing, the one or more processors determine whether the space exists behind the preceding vehicle at the present time, on the basis of the recognition result from the one or more processors; and
wherein in a case of the intersection, the one or more processors determine that there is not the open space on a basis of a first lighting state of a brake lamp of the preceding vehicle, and that there is the space on a basis that a second lighting state of the brake lamp of the preceding vehicle, the first lighting state indicating that the preceding vehicle is stopped, the second lighting state indicating that the preceding vehicle is currently traveling forward.

2. The vehicle control device according to claim 1, wherein if a distance between the preceding vehicle and the exit of the railroad crossing is more than a length of the host vehicle, the one or more processors determine that the space exists.

* * * * *